United States Patent [19]
Koizumi et al.

[11] Patent Number: 5,982,537
[45] Date of Patent: Nov. 9, 1999

[54] SPEAKER APPARATUS WITH A PICTURE PROJECTING SCREEN

[75] Inventors: Hiroshi Koizumi, Saitama; Yoshimi Saito; Hiroshi Matsumoto, both of Kanagawa, all of Japan

[73] Assignee: Sony Corporation, Tokyo, Japan

[21] Appl. No.: 08/904,960

[22] Filed: Aug. 1, 1997

[30] Foreign Application Priority Data

Aug. 16, 1996 [JP] Japan .................................. 8-216469
Nov. 28, 1996 [JP] Japan .................................. 8-331420

[51] Int. Cl.⁶ .................................................. G03B 21/58
[52] U.S. Cl. .......................... 359/444; 359/461; 381/301; 381/306; 381/388
[58] Field of Search .................................... 359/444, 445, 359/461, 443; 352/36; 353/18; 381/388, 124, 386, 152, 301, 306

[56] References Cited

U.S. PATENT DOCUMENTS

| | | |
|---|---|---|
| D. 366,055 | 1/1996 | Matsunaga et al. .................... D16/241 |
| 1,027,371 | 5/1912 | Bates et al. ............................... 359/461 |
| 1,813,542 | 7/1931 | Owens ........................................ 352/36 |
| 3,205,772 | 9/1965 | Guske .................................... 88/28.91 |
| 4,169,658 | 10/1979 | Brown ..................................... 350/118 |
| 4,190,738 | 2/1980 | Samuels ................................... 179/1 E |
| 5,448,647 | 9/1995 | Koizumi .................................... 381/90 |
| 5,581,401 | 12/1996 | Takamoto et al. ....................... 359/443 |

*Primary Examiner*—Safet Metjahic
*Assistant Examiner*—Christopher E. Mahoney
*Attorney, Agent, or Firm*—Jay H. Maioli

[57] ABSTRACT

A system for mounting a picture projection screen between two upright floor-standing speaker units in which the picture screen can be drawn out from one of the speaker units and extended to and attached to the other speaker unit in one position and retracted back into the first speaker unit in another position includes a winding system arranged in the one speaker unit and an attaching system for attaching the free end of the screen in the other speaker unit. The winding system and the attaching system can be arranged to be repositioned so that at top edge of the screen is above the upper surfaces of the speaker units so as to provide access to electronic equipment arranged at a lower level between the two speaker units.

8 Claims, 16 Drawing Sheets

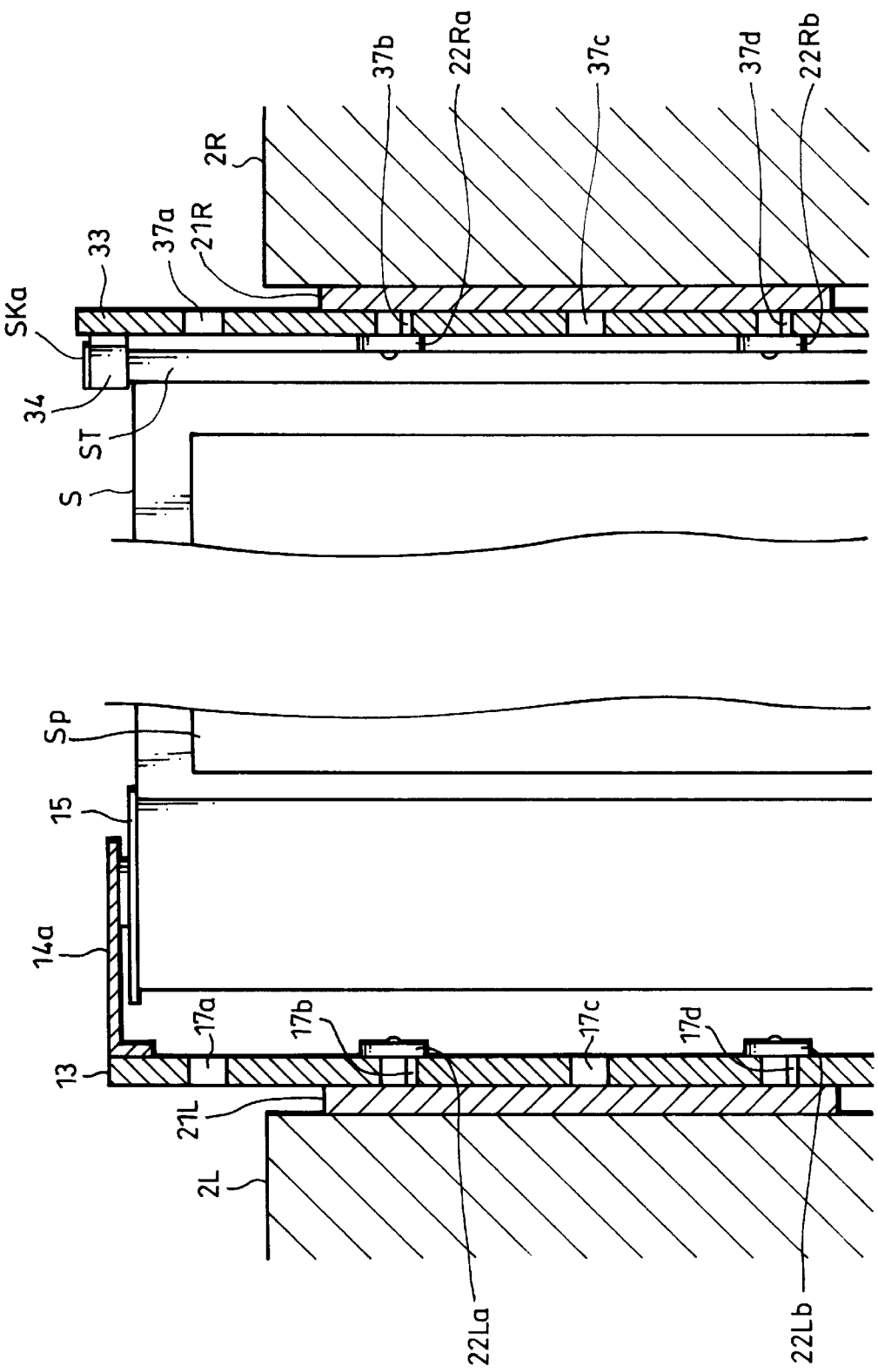

SPEAKER APPARATUS WITH A PICTURE PROJECTING SCREEN

BACKGROUND OF THE INVENTION

The present invention relates to a speaker apparatus with a picture projecting screen.

Recently, because of the increase of video players for reproducing a high-quality picture signal such as, for example, a digital VTR (video tape recorder) or a DVD reproducer (DVD: Digital Versatile Disk), and because of the spread of video monitors for displaying a high-quality picture and a stereo reproducer for reproducing high-quality sound, it has come to be possible to construct an AV apparatus (AV: Audio Visual) in homes, which can reproduce a vivid and powerful picture of a movie, sport, music or the like by a wide screen, with a high-quality picture, and a high-quality sound.

By referring to FIGS. 1 and 2, prior art examples of such AV apparatus will be described below. First, by referring to FIG. 1, an AV apparatus is described, which has a monitor whose display unit is formed of a CRT (Cathode Ray Tube).

In FIG. 1, 80 indicates an AV apparatus as a whole. Left and right speakers 81L, 81R reproducing stereo sounds are located on the left and right sides apart from each other by a specified distance, and at the center between the left and right speakers 81L, 81R, a monitor unit 82 mounted on a rack 83 is located.

In the rack 83, for example, AV devices such as a digital VTR 84 or a DVD reproducer 85 are contained. Picture signals from the AV devices such as the digital VTR 84 or the DVD reproducer 85 are supplied to the monitor unit 82 to display a picture, and at the same time, sound signals are supplied to the left and right speakers 81L, 81R to reproduce stereo sounds.

Such an AV apparatus 80 is located, for example, along a wall of a room or the like, and viewers face to the AV apparatus 80 to look at (enjoy) the pictures of a movie or the like.

In the AV apparatus 80 of FIG. 1, a picture screen of the monitor 82 is made large-sized. If a still larger picture screen is to be achieved, it is necessary to arrange a projector and a large-sized screen in place of the monitor 82 so as to project and display a picture on the screen.

Next, by referring to FIG. 2, a prior art example of an AV apparatus with a projector and a screen will be described. However, in FIG. 2, AV devices such as the digital VTR 84, the DVD reproducer 85 or the like in FIG. 1 are omitted in the figure. Left and right speakers 81L, 81R for reproducing stereo sounds are located on the left and right sides by a specified distance apart from each other, and between the left and right speakers 81L, 81R, a screen 91 hung on a wall or the like is located, and a projector 90 is located on the floor in front of (behind is also possible) the screen 91.

On the screen 91, a rectangular picture projecting portion 91a coated with fine glass beads is formed, and a large-sized picture with a diagonal length of, for example, 80 to 120 inches can also be projected.

Picture signals from AV devices such as the digital VTR, the DVD reproducer and so on, which are not shown in the figure, are supplied to the projector 90, and the light projected from the projector 90 is projected on the screen 91 to reflect a picture of a wide screen, and at the same time, sound signals are supplied to the left and right speakers 81L, 81R to emit stereo sounds.

Furthermore, the screen 91 may be a screen hung down from a ceiling or a screen supported by a pair of poles instead of a screen hung on a wall or the like. Moreover, the projector 90 also may be attached to a ceiling to be used instead of a projector put on a floor.

According to the prior art AV apparatus in FIG. 1, a picture with high brightness can be displayed by the monitor unit 82. Moreover, according to the prior art AV apparatus in FIG. 2, a picture of a wide screen can be projected on the screen 91.

When not used, the screen 91 of the prior art AV apparatus in FIG. 2 is, for example, to be removed from, for example, the wall and accommodated in a closet or the like for preventing the screen 91 from being stained or preventing the screen 91 from interfering, and further, when the screen 91 is used, the screen 91 is to be taken out of the closet or the like. Consequently, handling of the screen is inconvenient and ensuring a place for accommodating the screen also becomes necessary.

Furthermore, in the screen 91 to be hung on the wall when used among screens 91 of the prior art AV apparatus, the height of the screen 91 cannot easily be adjusted afterward, in a case where a hook is secured in a position at a specified height of the wall considering the looking and listening position of viewers and the screen 91 is hooked on the hook.

Moreover, another screen device may be imagined, in which a screen is wound up to a ceiling or the like with a motor when not used, and is rewound down to be spread along the wall when used. However, it is not suitable for use in a common household because the price of the apparatus itself and the expense of the installation are high.

Furthermore, in a case where AV devices such as the digital VTR 84, the DVD reproducer 85 and so on are located between the left and right speakers 81L, 81R like the AV apparatus in FIG. 1, and in front of the AV devices, the screen 91 like a screen of the AV apparatus in FIG. 2 is located, the screen stands in the way when adjusting the AV devices to be used by operating knobs of the AV devices or by using a remote commander.

Furthermore, in the prior art AV apparatus in FIG. 1, in a case where the screen 91 used in the prior art AV apparatus in FIG. 2 is located in front of the monitor unit 82, and the monitor 82 and the screen 91 are selectively used, the screen 91 should be put away and be accommodated in a closet or the like even when the monitor unit 82 is to be used. Consequently, the selective use of the monitor unit 82 and the screen 91 becomes complicated.

Moreover, in a case where the monitor unit 82 and the screen 91 are located in separate positions and are used selectively, the positions of the left and right speakers 81L, 81R need to be changed according to each use so that sounds may be listened in a good orientation, and consequently, the use becomes complicated.

SUMMARY OF THE INVENTION

In view of such points, a first object of the present invention is to propose an apparatus which makes it easy to prepare a screen when used and to accommodate the screen when not used, and further, which makes it unnecessary to ensure a place for accommodating the screen.

A second object of the present invention is to propose an apparatus which makes it easy to prepare a screen when used and to accommodate the screen when not used, and makes it unnecessary to secure a place for accommodating the screen, and further, which makes it possible to easily adjust the height of the screen.

A speaker apparatus with a picture projecting screen according to the present invention, comprises a first speaker and a second speaker; a picture projecting screen; a screen winding means provided on the first speaker and holding one side edge of the screen and winding up the screen; and a screen holding means provided on the second speaker and holding the other side edge of the screen.

According to the present invention described above, by using the screen winding means and the screen holding means provided on the first and second speakers respectively, the picture projecting screen can be spread between the first and second speakers, and when the screen is no used, the screen is wound up by the screen winding means.

According to the present invention, a speaker apparatus with a picture projecting screen can be obtained, which makes it easy to prepare the screen when used and to house the screen when not used, and further, which makes it unnecessary to ensure a place for housing the screen, since the speaker apparatus comprises a first speaker and a second speaker, a picture projecting screen, a screen winding means located on the first speaker and holding one edge of the screen and winding up the screen, and a screen holding means located on the second speaker and holding the other edge of the screen.

According to the present invention, a speaker apparatus with a picture projecting screen can be obtained, which makes it easy to prepare the screen when used and to house the screen when not used, and which makes it unnecessary to ensure a place for housing the screen, and further, which makes it difficult for dust to adhere to the screen when the screen is not used, since the speaker apparatus comprises a first speaker and a second speaker, a picture projecting screen, a screen winding means located on the first speaker and holding one edge of the screen and winding up the screen, a screen holding means located on the second speaker and holding the other edge of the screen, and a housing portion located in the first speaker and housing the screen wound up by the screen winding means.

According to the present invention, a speaker apparatus with a picture projecting screen can be obtained, which makes it easy to prepare the screen when used and to house the screen when not used, and which makes it unnecessary to ensure a place for housing the screen, and further, which makes it possible to easily adjust the height of the screen, since the speaker apparatus comprises a first speaker and a second speaker, a picture projecting screen, a screen winding means located on the first speaker and holding one edge of the screen and winding up the screen, a screen holding means located on the second speaker and holding the other edge of the screen, and attaching means respectively attaching the screen winding means and the screen holding means to the left and right speakers to be movable in the vertical direction.

Thus, by forming the attaching means respectively attaching the screen winding means and the screen holding means to the first and second speakers to be movable in the vertical direction, it becomes possible, for example, that the height of the screen is changed according to the position where the viewers look at the picture, and that the rack is made to face to the viewers. Therefore, when AV devices are located behind the screen, the AV devices can easily be operated by handling knobs or a remote commander. Furthermore, by locating a monitor unit behind the screen and locating a projector in front of or behind the screen, the monitor unit and the screen can be used selectively.

Furthermore, since an attaching means respectively attaching the screen winding means and the screen holding means to the first and second speakers to be movable in the vertical direction is formed of a groove forming body in which a plurality of attaching grooves and a guide groove in communication with the plurality of attaching grooves are formed, and an attaching projection forming body having attaching projections engaged with the plurality of attaching grooves and guided by the guide groove, the height of the screen can be changed step by step.

Furthermore, since an attaching means respectively attaching the screen winding means and the screen holding means to the first and second speakers to be movable in the vertical direction is formed of a pair of fitting members slidably fitted to each other, the height of the screen can be changed continuously.

BRIEF DESCRIPTION OF THE DRAWINGS

FIG. 14A is a cross sectional view showing a neighborhood of a winding portion in a state where the winding portion and the holding portion are secured at a position higher than left and right speakers;

FIG. 14B is a cross sectional view showing a neighborhood of the holding portion in that state;

DETAILED DESCRIPTION OF THE PREFERRED EMBODIMENT

The present invention is a speaker apparatus with a picture projecting screen, comprising a first speaker and a second speaker a picture projecting screen, a screen winding means provided on the first speaker and holding one side edge of the screen and winding up the screen; and a screen holding means provided on the second speaker and holding the other side edge of the screen.

In such a speaker apparatus, an accommodation portion for accommodating the screen wound up by the screen winding means can be provided in the first speaker.

In the above mentioned speaker apparatus, attaching means can be formed, which respectively attach the screen winding means and the screen holding means to the first and second speakers to be movable in an up and down or vertical direction.

The attaching means can comprise a groove forming body having a plurality of engaging grooves and a guide groove in communication with the plurality of attaching grooves; and an attaching projection forming body having attaching projections engaging with the plurality of attaching grooves and guided by the guide groove.

Furthermore, the above mentioned attaching means can comprise a pair of fitting members slidably fitted to each other.

Figures 3A, 3B:
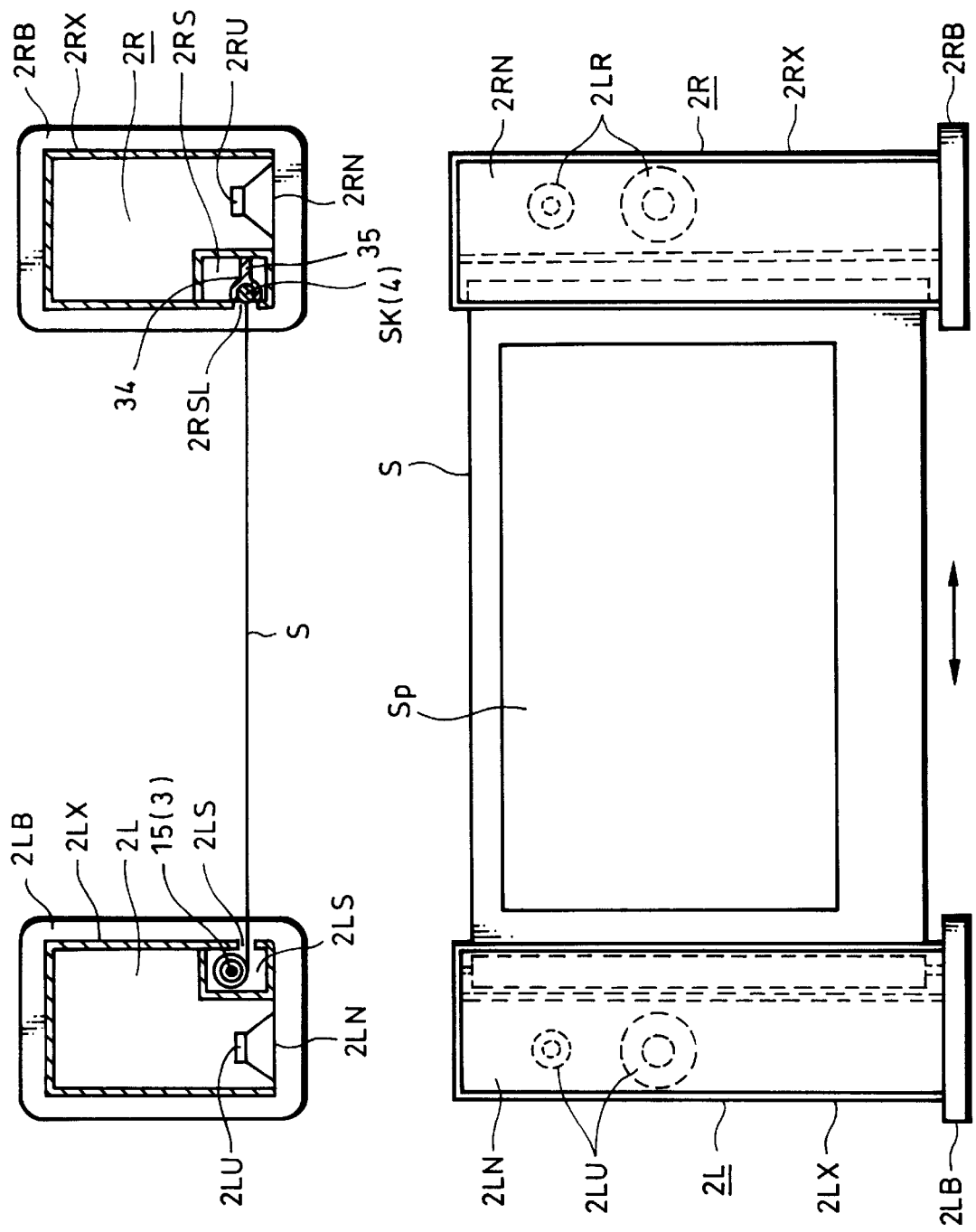
FIG. 3A is a cross sectional view of a first embodiment of the present invention in its used state.
FIG. 3B is a front view of the first embodiment in its used state.
Figure 4:
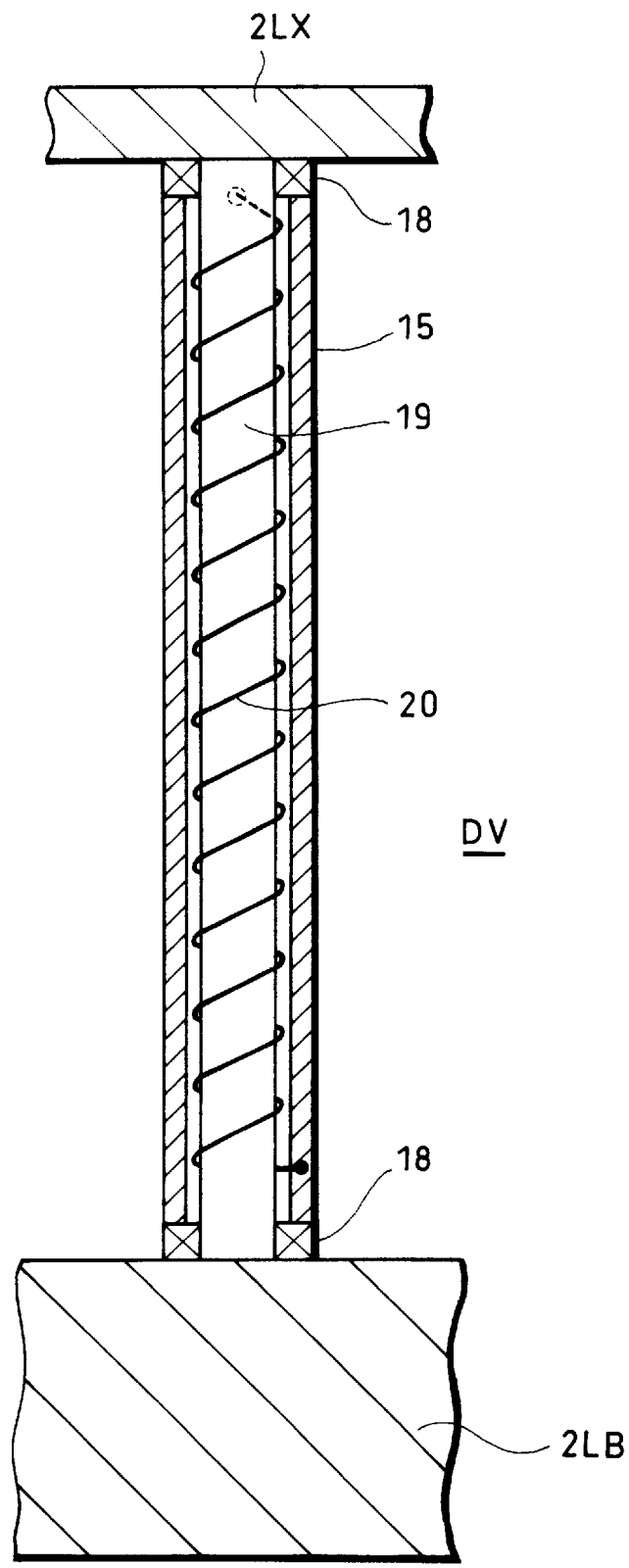
FIG. 4 is a cross sectional view showing a driving means for rotating a winding bar of the first embodiment.

A first embodiment of the speaker apparatus with a picture projecting screen according to the present invention, will be described below in detail with reference to FIGS. 3 to 5. First, FIGS. 3A, 3B showing the whole structure of the embodiment will be described. FIG. 3A is a cross sectional view of the speaker apparatus and FIG. 3B is its front view. As shown in FIGS. 3A and 3B, there are provided left and right speakers 2L and 2R, which are respectively formed of left and right speaker units 2LU, 2RU and left and right speaker boxes 2LX, 2RX in which the left and right speaker units 2LU, 2RU are respectively housed. To the front sides of the left and right speaker boxes 2LX, 2RX, covers (nets) 2LN, 2RN are respectively attached, which protect the left and right speaker units 2LU, 2RU housed therein respectively. Furthermore, 2LB and 2RB designate base stands of the speaker boxes 2LX, 2RX, respectively. Such left and right speakers 2L, 2R are each a large-sized speaker having a weight of, for example, 30 kg.

There is provided a sheet-like screen S having a constant width which has formed thereon a rectangular picture projecting portion Sp (coated over with fine glass beads). To one side edge of the screen S, a winding bar 15 constituting a screen winding means 3 is secured, and the winding bar 15 is rotatably attached, for example, in a housing portion 2LS located on the front right side in the left speaker box 2LX. There is formed a slit 2LSL through which the screen S goes in and out and which is located on the right side of the left speaker box 2LX. The left speaker unit 2LU is attached on the front left side in the left speaker box 2LX, facing to the front. Further, the right speaker unit 2RU is attached on the front right side in the right speaker box 2RX, facing to the front.

Next, by referring to FIG. 4, a driving means DV for driving the winding bar 15 to rotate when winding up the screen S around the winding bar 15, will be described. The above mentioned winding bar 15 is formed like a circular pipe, and is rotatably attached around a shaft 19 secured between the ceiling of the left speaker box 2LX and the base stand 2LB. Between the winding bar 15 and the ceiling of the speaker box 2LX, and between the winding bar 15 and the base stand 2LB, bearings 18, 18 are interposed, respectively. Around the shaft 19, a helical spring 20 is wound, and one end thereof is secured to the shaft 19 and the other end thereof is secured to the winding bar 15.

Turning back to FIG. 3, the description will be continued. To the other side edge of the screen S, a holding bar SK as a screen holding means 4 is attached. The holding bar SK has such a thickness as not to pass the slit 2LSL of the left speaker box 2LX. A connecting portion 34 connected to the holding bar SK is attached in a housing portion 2RS located on the front left side in the right speaker box 2RX. When the holding bar SK is, for example, shaped like a column, the connecting portion 34 is made of an elastic material such as plastics, rubber or the like, and is shaped like a channel with a partial-circle-like cross section of approximately 270° (having an inner diameter a little larger than the outer diameter of the holding bar SK), and is formed integrally with a pillar-like base portion 35, and the base portion 35 is, for example, attached with screws to the side wall in the housing portion 2RS located on the front left side in the right speaker box 2RX. There is formed a slit 2RSL through which the holding bar SK goes in and out, and which is located on the left side of the right speaker box 2RX.

A projector for projecting a picture, which is omitted in the figure, is to be located in front of or behind the screen S in FIG. 3B.

Figure 5A:
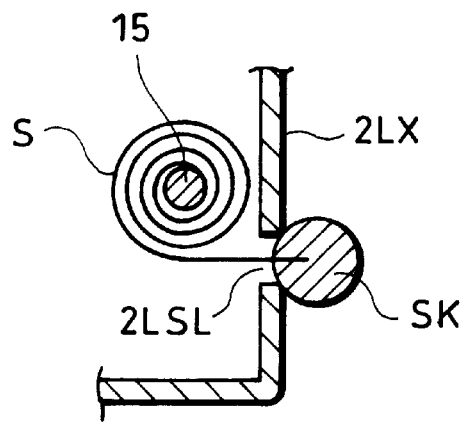
FIG. 5A is a cross sectional view showing a part of a speaker box in a state where a screen is accommodated in a left speaker box.
Figure 5B:
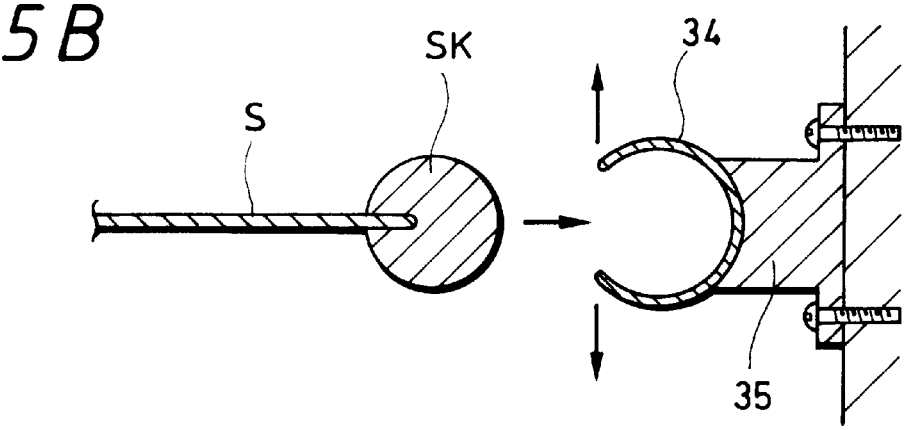
FIG. 5B is a cross sectional view of a holding bar and a connecting portion showing a state created just before the holding bar of a screen is connected to the connecting portion.
Figure 5C:
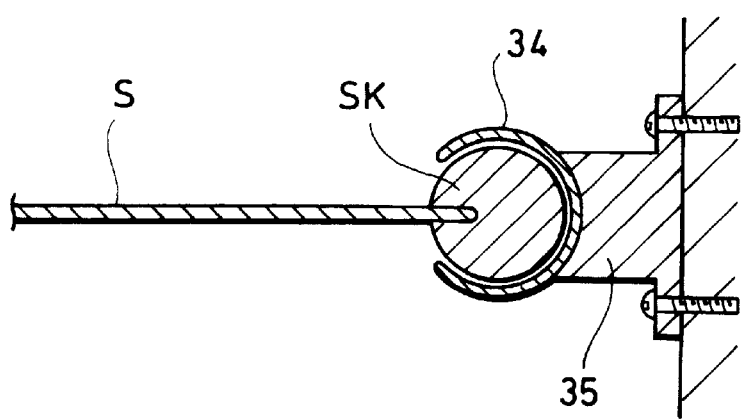
FIG. 5C is a cross sectional view of the holding bar and the connecting portion showing a state where the connecting bar is connected to the connecting portion.

Next, by referring to FIG. 5 together with FIGS. 3, 4, the operation of the first embodiment will be described. When the screen S is to be used, the screen S in a state where the screen S is wound up around the winding bar 15 as shown in FIG. 5A, is pulled out of the housing portion 2LS of the left speaker box 2LX through the slit 2LSL to the outside by pulling the holding bar SK against the elastic force of the helical spring 20, and the holding bar SK is moved to a position adjacent to the right speaker box 2RX as shown in FIG. 5B. The connecting portion 34 can be widened to both sides as shown in FIG. 5B. Therefore, by pushing the holding bar 34 into the connecting portion 34, the holding bar 34 is fitted in and connected to the connecting portion 34 as shown in FIG. 5C. Then, the space between the left and right speakers 2L, 2R is widened, and there the screen S is spread between the left and right speakers as shown in FIGS. 3A, 3B.

When the screen S is to be housed, either or both the left and right speakers 2L, 2R are moved so as to narrow the space between the left and right speakers 2L, 2R, and after that, the winding bar 15 is rotated in a clockwise direction by the elastic force of the helical spring 20, so that the screen S is wound up around the winding bar 15. Then, after disengaging the holding bar SK from the connecting portion 34 by pulling the screen S, the winding bar 15 is rotated again in a clockwise direction by the elastic force of the helical spring 20 so that the rest of the screen S is wound up around the winding bar 15. At that time, the holding bar SK is stopped at the slit 2LSL of the left speaker box 2LX as shown in FIG. 5A.

As the driving means DV, a crank or the like for manually rotating the winding bar 15 is also available.

Moreover, it is also possible that one and the other of the holding bar SK and the connecting portion 34 are made of a permanent magnet and a ferromagnetic body respectively so that the holding bar SK is connected to the connecting portion 34 by magnetic force. Furthermore, other various modifications of the structure of the holding bar SK and the connecting portion 34 are possible.

Next, by referring to FIGS. 6 to 18, an AV apparatus as a second embodiment of a speaker apparatus with a picture projecting screen according to the present invention, will be described in detail in the following order:

(1) Structure of an AV apparatus (2) Structure of an attaching member (3) Structure of a winding portion of a screen (4) Structure of a holding portion of a screen (5) Secured state of a screen (6) Modifications of the winding portion and the holding portion

(1) Structure of an AV Apparatus

Figure 6A:
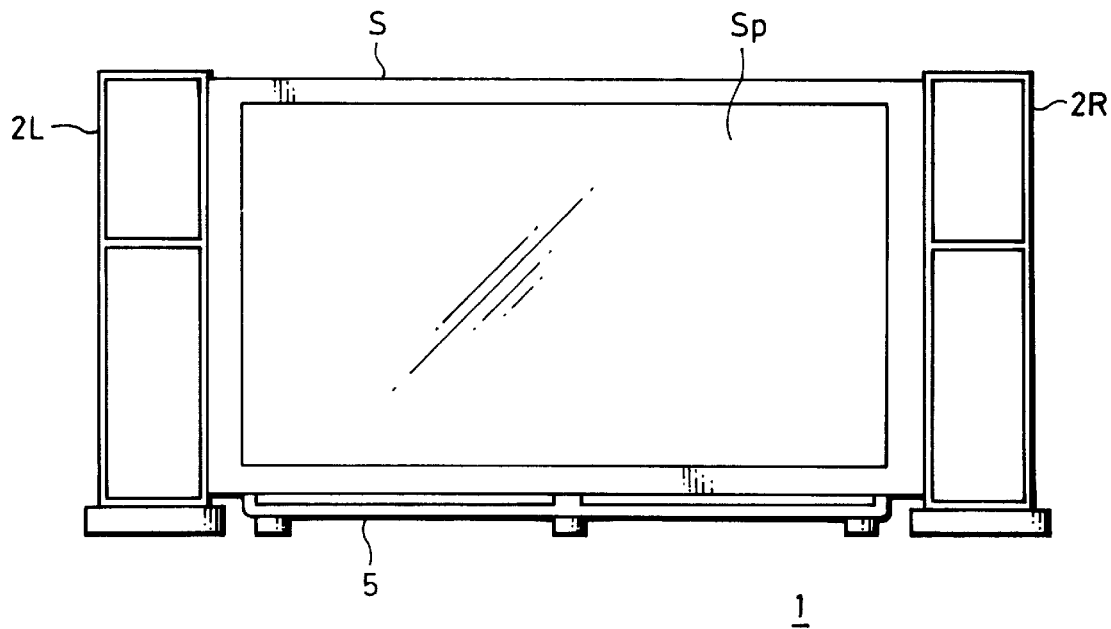
FIG. 6A is a front view of a state where a screen of an AV apparatus as a second embodiment of the present invention is spread at the same height as speakers.
Figure 6B:
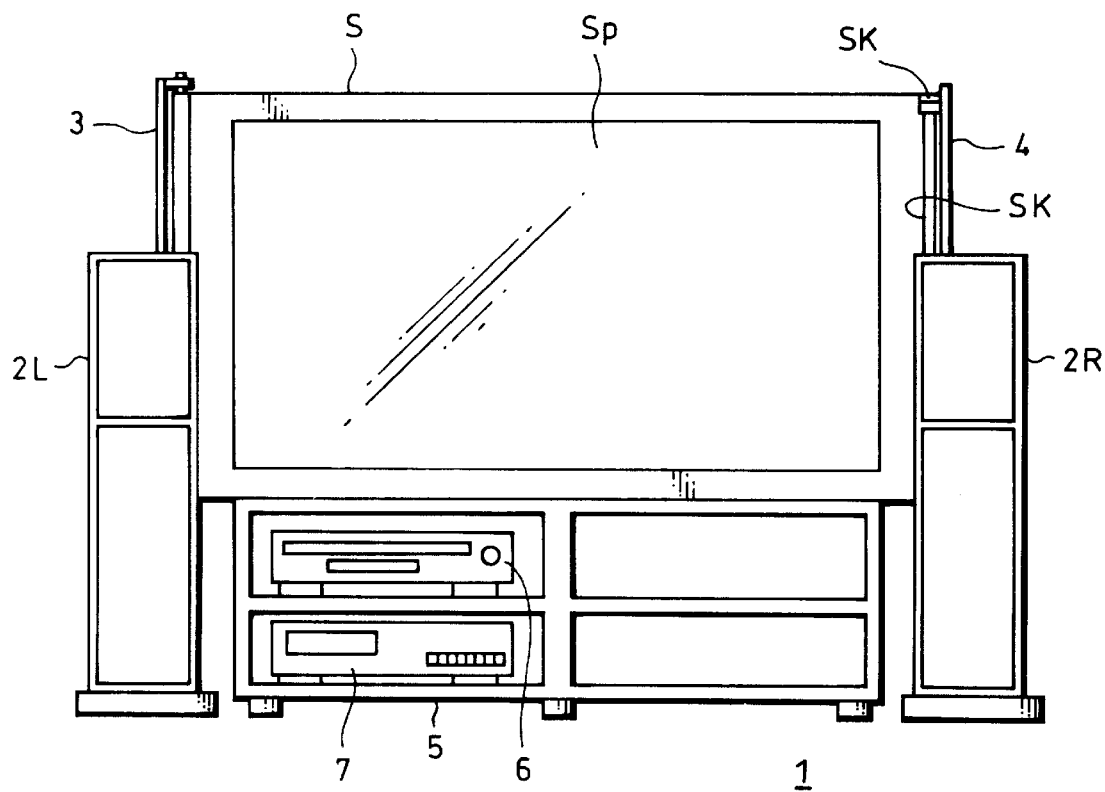
FIG. 6B is a front view of a state where the screen of the AV apparatus is spread at a position higher than the speakers.

By referring to FIGS. 6A, 6B, a whole structure of the AV apparatus will be described below. FIG. 6A and FIG. 6B are front views of the AV apparatus, and FIG. 6A shows a state where a screen is spread the same height as the height of the speakers and FIG. 6B shows a state where the screen is spread at a position higher than the speakers.

In FIGS. 6A, 6B, the AV apparatus is generally at reference numeral 1. A left speaker (for left side sounds) 2L and a right speaker (for right side sounds) 2R for reproducing stereo sounds are located on the left and right sides at a specified distance apart from each other, and between the left and right speakers 2L, 2R, a rack 5 is located. In the rack 5, for example, AV devices such as a digital VTR 6, a DVD reproducer 7 or the like are housed. Between the speakers 2L, 2R, a roll type screen S can be spread.

To the left speaker 2L, for example, as shown in FIG. 6B, a winding portion 3 is attached, which secures one side end edge of the screen S and can wind up the screen S. Furthermore, to the right speaker 2R, a holding portion 4 capable of holding the other side end edge of the screen S is attached. The winding portion 3 and the holding portion 4 are vertically movably attached to the left and right speakers 2L, 2R. Therefore, as shown in FIGS. 6A, 6B, the height at which the screen S is spread, can be changed.

Consequently, for example, while the height of the screen S can be changed according to the position where the viewers look at the picture, the rack 5 can be made facing to the viewers, so that it becomes possible to operate the AV devices such as the digital VTR 6, the DVD reproducer 7 and so on by handling knobs or a remote commander.

By increasing the weight of the left and right speakers 2L, 2R, for example, to 30 kg, both the speakers 2L, 2R are prevented from being moved or inclined by the tensile force of the screen S even when the screen S is spread between both the speakers 2L, 2R, and both the speakers 2L, 2R are kept in a stable state. Furthermore, this will also prevent the screen S from being loosen.

The screen S is formed to be a lateral roll type, and one side end edge in the horizontal direction is attached to the winding portion 3 mounted on the left speaker 2L. When the screen S is not used, the screen S is wound up by the winding portion 3, and is housed in a part of a box-like body of the left speaker 2L. Moreover, at the upper and lower ends of a holding bar ST (the other end side) of the screen S, fitting portions SK are formed, and by pulling out the screen S from the winding portion 3 and the fitting fitting portions SK in the fitting portions of the holding portion 4 formed on the right speaker 2R, the screen S can be spread between the left and right speakers 2L, 2R.

At the bottom portion of the screen S, a weight (which is not shown in the figure) is located so as to improve the stability when the screen S is spread and to keep the flatness of a picture projecting portion Sp thereof.

On the screen S, a rectangular picture projecting portion Sp coated with fine glass beads is formed, and a large-sized picture with a diagonal length of, for example, 80 to 120 inches, can be reflected.

Figure 1:
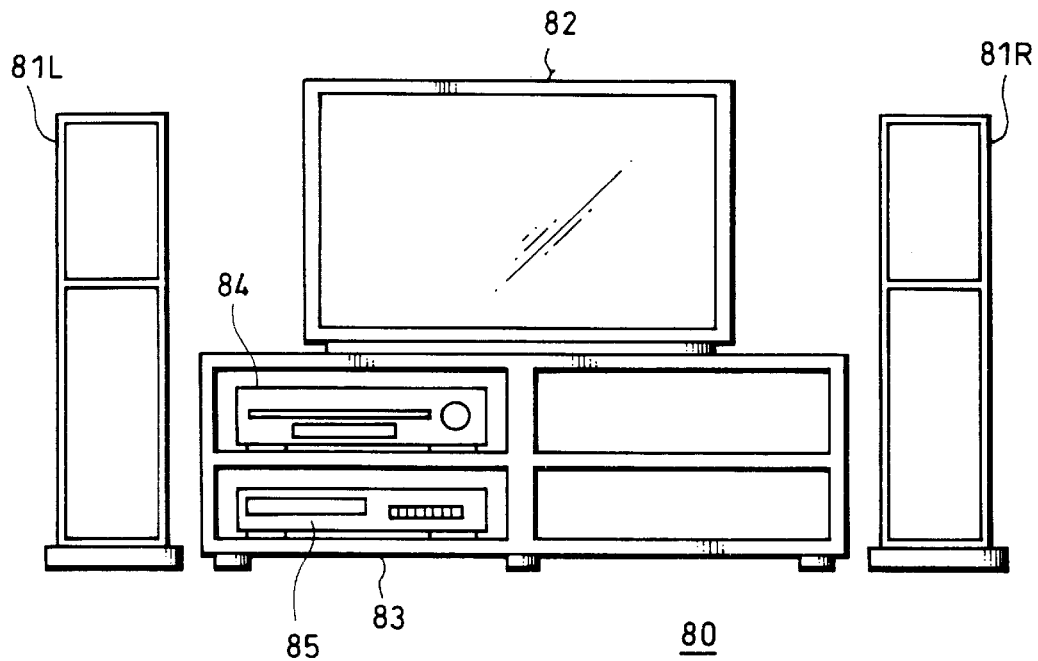
FIG. 1 is a front view showing one example of the prior art AV apparatus.

Furthermore, on the far side of the screen S, a monitor unit (which is not shown in FIGS. 6A, 6B) mounted on the rack 5, similar to the prior art monitor unit 82 in FIG. 1, is located in a positional state similar to the state in FIG. 1, and the monitor unit on the rack 5 is arranged to appear when the screen S is wound up by the winding portion 3.

Figure 2:
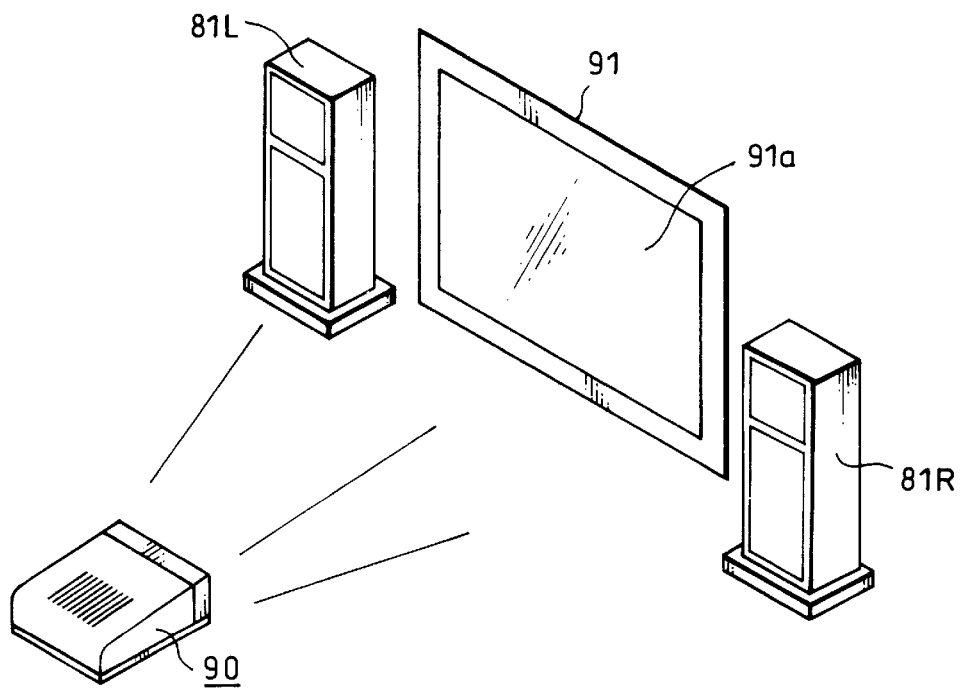
FIG. 2 is a perspective view showing another example of prior art AV apparatus.

Accordingly, when wanting to see a picture by using the monitor unit without using the screen S, the screen S is wound up and housed in the left speaker 2L. Moreover, when wanting to project a picture on the screen S by using a projector (not shown in the figure) similar to the prior art projector 90 in FIG. 2 so as to see the projected picture, the screen S should be spread between the left and right speakers 2L, 2R as shown in FIG. 6A or FIG. 6B.

Thus, according to the second embodiment, housing and spreading of the screen S, and changing of the height of its spreading can easily be performed by providing the winding portion 3 and the holding portion 4 on the left and right speakers 2L, 2R respectively.

(2) Structure of an Attaching Member

Figure 7A:
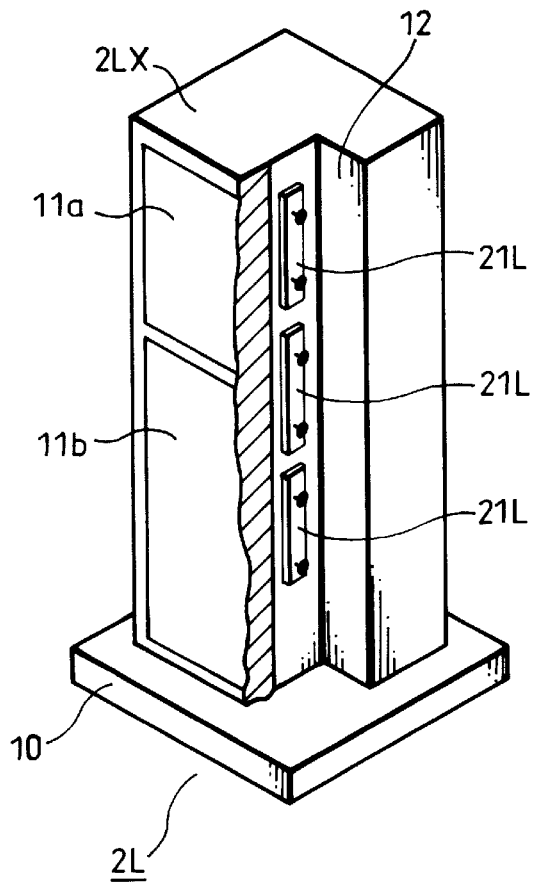
FIG. 7A is a perspective view showing a left speaker and attaching members attached in a ditch formed in the speaker.
Figure 7B:
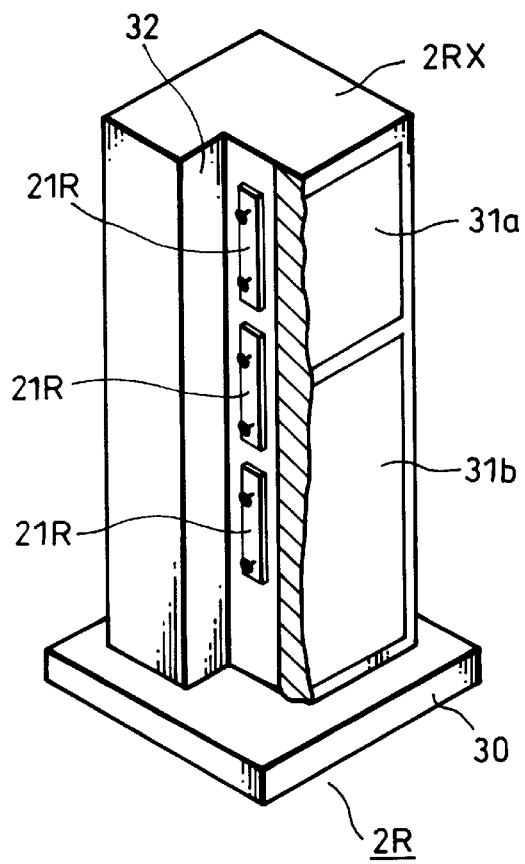
FIG. 7B is an illustration showing a right speaker and an attaching member attached to a groove of the speaker.
Figure 7C:
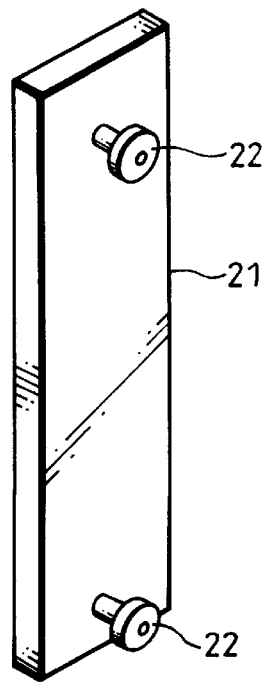
FIG. 7C is a perspective view showing only an attaching member in an enlarged state.

Next, by referring to FIGS. 7A, 7B, 7C, attaching members will be described, which are provided on the left and right speakers 2L, 2R as securing means and attach and secure the winding portion 3 and the holding portion 4. FIG. 7A is a perspective view showing the left speaker 2L and an attaching member attached to a groove formed in the speaker 2L. FIG. 7B is a perspective view showing the right speaker 2R and an attaching member attached to a groove formed in the speaker 2R. FIG. 7C is a perspective view illustration showing only an attaching member in an enlarged scale. For convenience, the left and right speakers 2L, 2R illustrated in FIGS. 7A, 7B are shown in such a way that a part of each groove is cut off and is treated with hatching.

As shown in FIGS. 7A, 7B, for improving the sense of stability when the left and right speakers 2L, 2R are positioned, the speakers 2L, 2R are mounted on base stands 10, 30 respectively.

On the front surfaces of both speaker boxes 2LX, 2RX (box-like bodies) of the left and right speakers 2L, 2R, covers (nets) 11a, 11b and covers 31a, 31b are attached respectively, which perform protection or the like of each of the speaker units (not shown in the figure) housed in both the speaker boxes 2LX, 2RX.

On the surfaces facing each other of the left and right speaker boxes 2LX, 2RX, grooves 12, 32 are formed respectively. Three attaching members (attaching projection forming bodies) 21L, 21L, 21L on the left speaker 2L side and three attaching members 21R, 21R, 21R of the right speaker 2R, are attached in the groove 12 of the speaker 2L and in the groove 32 of the speaker 2R, respectively. On each of attaching members 21 (21L, 21R), for example, two attaching screws (attaching projections) 22, 22 are projectingly formed, as shown in FIG. 7C in an enlarged scale.

The attaching screws 22, 22 are formed so as to be fitted in a plurality of attaching grooves and a guide groove in communication with the plurality of attaching grooves formed in each of the back boards (groove forming bodies) respectively supporting the winding portion 3 and the holding portion 4, which are described later with reference to FIGS. 9A to 9C and FIGS. 12A to 12E. It is arranged that the attaching screws 22, 22 are fitted in the guide groove, and the winding portion 3 and the holding portion 4 can freely move in the up and down direction along the guide groove, and are secured at a height corresponding to the attaching screw 22.

In FIGS. 7A to 7C, a case is shown as an example, where three attaching members 21 on each of which two attaching screws 22, 22 are projectingly formed, are located in each of the grooves 12, 32. However, any number of such attaching members 21 can be provided according to the diagonal length of the screen S (expressed in inches) or the height of the speaker itself.

(3) Structure of a Winding Portion of a Screen

Figure 8A:
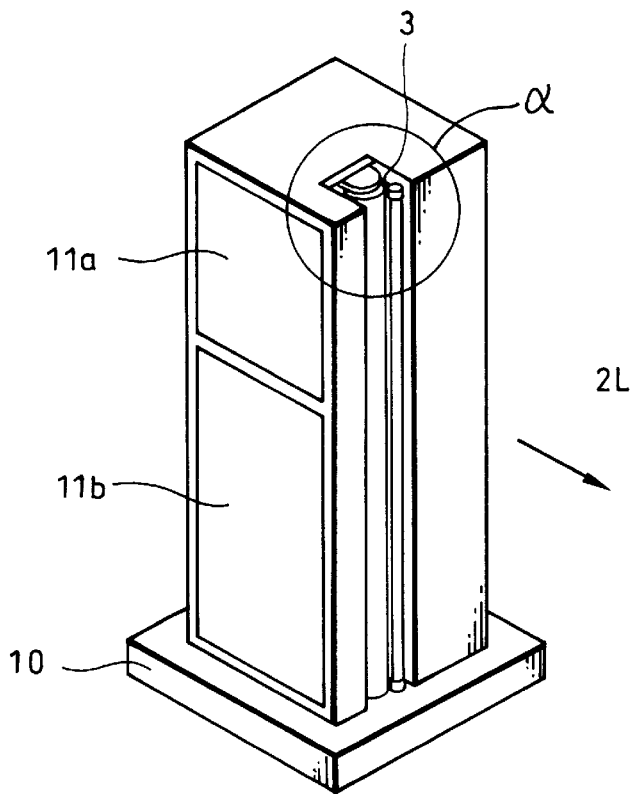
FIG. 8A is a perspective view of the left speaker to which a winding portion is attached.
Figure 8B:
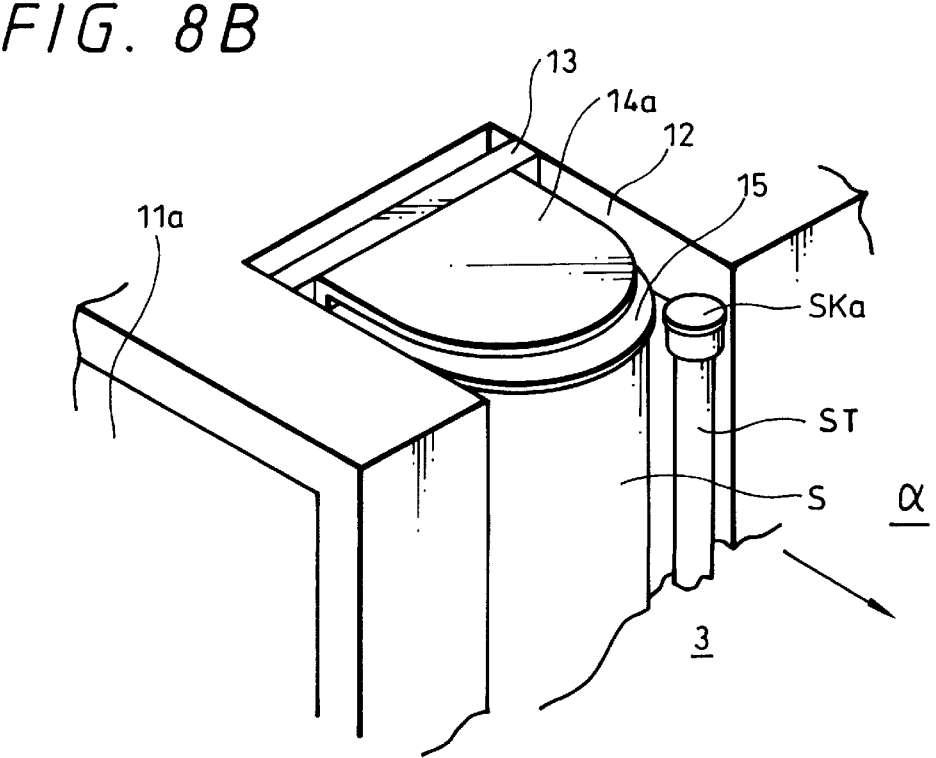
FIG. 8B is a perspective view showing a neighborhood of a part enclosed by a circle α shown in FIG. 8A, in an enlarged state.
Figure 9C:
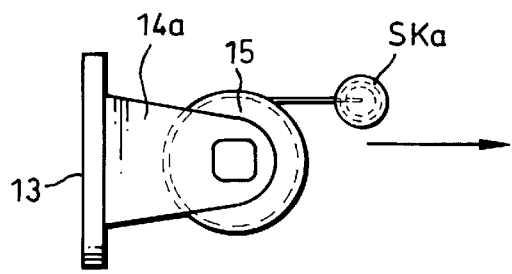
FIG. 9C is a top view thereof.
Figure 9A:
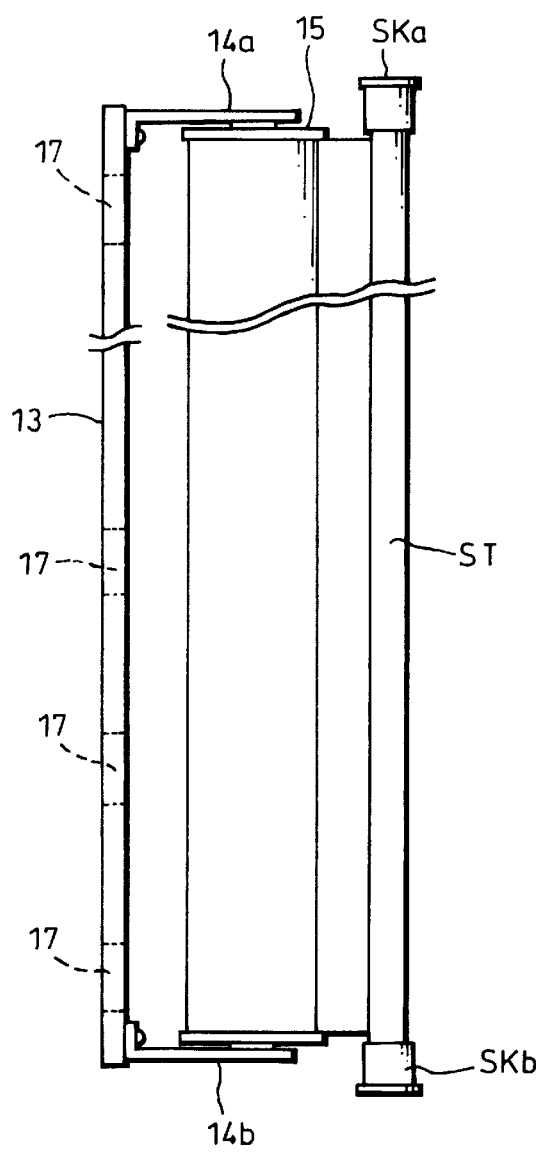
FIG. 9A is a side view showing only the part of a winding portion.
Figure 9B:
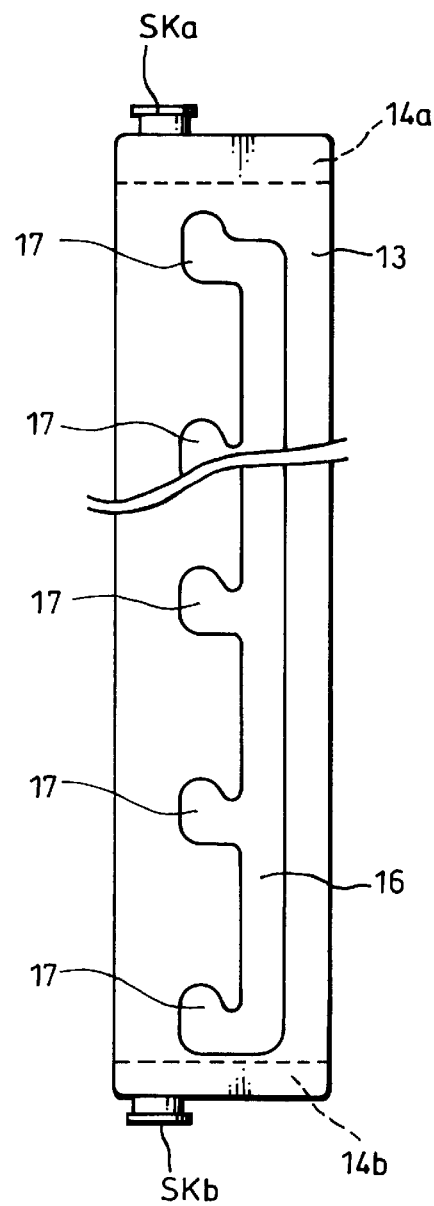
FIG. 9B is a side view thereof.

Next, by referring to FIGS. 8A, 8B and FIGS. 9A to 9C, a winding portion of a screen will be described. FIG. 8A is a perspective view of the left speaker 2L to which a winding portion 3 is attached, and FIG. 8B is a perspective view showing, in an enlarged scale, a neighborhood of a part enclosed by a circle α shown in FIG. 8A. FIGS. 9A to 9C show only the part of the winding portion 3, and FIG. 9A is a side view thereof, FIG. 9B is a back view thereof, and FIG. 9C is a top view thereof.

As shown in FIGS. 8A, 8B, the winding portion 3 is arranged so as to winding up a lateral roll type screen S and to house the same in a groove (housing portion) 12 of the speaker 2L. The winding portion 3 is formed of bearing portions 14a (14b) located at the upper end and the lower end of a back board 13 supporting the total thereof, and a winding shaft 15 supported by the bearing portions 14a (14b) and rotating so as to wind up the screen S. Then, by pulling a holding bar ST of the screen S in the direction shown by an arrow A, the screen S is drawn out of the winding shaft 15, and by fitting portions SKa (SKb) provided at the upper end and the lower end of the holding bar ST into fitted portions of the holding portion 4 (not shown in FIGS. 8A, 8B) to be described later in FIG. 11 and FIG. 12, the screen S can be spread between the left and right speakers 2L, 2R.

Next, FIGS. 9A to 9C will be described. In the back board (groove forming body) 13, a guide groove 16 and attaching grooves 17, 17, 17, 17, . . . are formed, and the attaching screws 22 of the attaching member 21L previously shown in FIGS. 7A to 7C are attached at the tip ends of the attaching grooves 17. When releasing the attaching state, the attaching screws 22 can be removed from the tip ends of the attaching grooves 17 by lifting the back board 13 a little upward. Furthermore, by releasing the attaching state and fitting the attaching screws 22 in the guide groove 16, the winding portion 3 can be moved in the vertical direction along the guide groove 16.

Thus, by forming a plurality of attaching grooves 17 and selecting arbitrary attaching grooves 17 among them, the height where the winding portion 3 is located, can easily be adjusted.

Each of attaching means attaching each of the screen winding means 3 and the screen holding means 4 to the first and second speaker, that is, the left and right speakers 2L, 2R to be movable in the vertical direction is formed of the back board (groove forming body) 13 in which a plurality of attaching grooves 17 and a guide groove 16 in communication with the plurality of attaching grooves 17 are formed; and attaching members (attaching projection formed bodies) 21 on which attaching screws (attaching projections) 22 engaged with to the plurality of attaching grooves 17 and guided by the guide groove 16 are formed.

Figure 10:
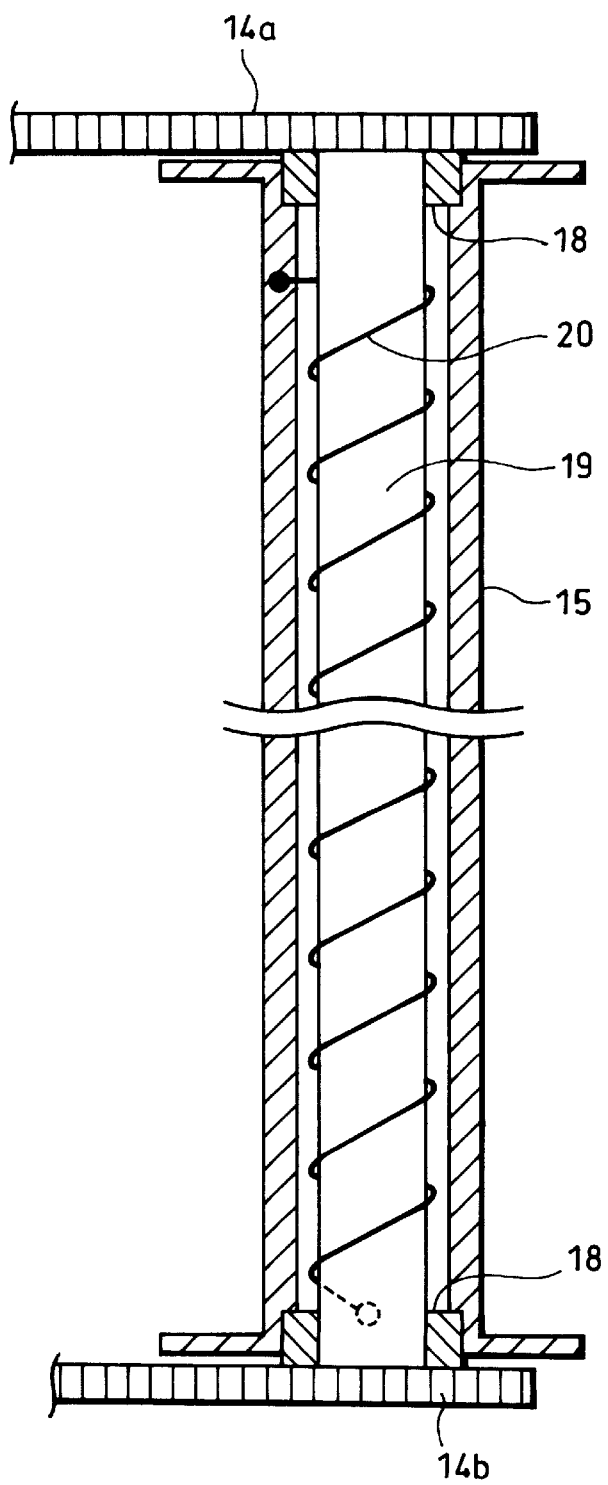
FIG. 10 is a cross sectional view showing a winding mechanism of a winding shaft.

Next, with reference to FIG. 10, the winding mechanism of the winding shaft 15 will be described. The winding shaft 15 is formed to be hollow, and the upper and lower ends thereof are secured to the bearing portions 14a, 14b through bearings 18, 18, so that the winding shaft 15 may smoothly rotate when winding-up and drawing-out of the screen S is performed.

In the hollow winding shaft 15, an inner shaft 19 is located, and is secured to the bearing portions 14a, 14b. Around the inner shaft 19, a helical spring 20 is wound, one end of which is attached to the winding shaft 15 and the other end of which is attached to the inner shaft 19. Accordingly, when the screen S is pulled out against the elastic force of the helical spring 20 and is spread between the left and right speakers 2L, 2R, the flatness thereof is kept by the elastic force of the helical spring 20. Furthermore, when winding up the screen S, the winding shaft 15 is rotated by the elastic force of the helical spring 20, so that the screen S can be wound up.

Furthermore, by using the elastic force of the helical spring 20, the screen S spread between the left and right speakers 2L, 2R can be arranged so as not to be loosened, so that the left and right speakers 2L, 2R can be positioned at any spacing within the lateral length of the screen S.

(4) Structure of a Holding Portion of a Screen

Next, by referring to FIGS. 11A, 11B and FIGS. 12A to 12E, a holding portion of a screen will be described. FIG.

Figure 11A:
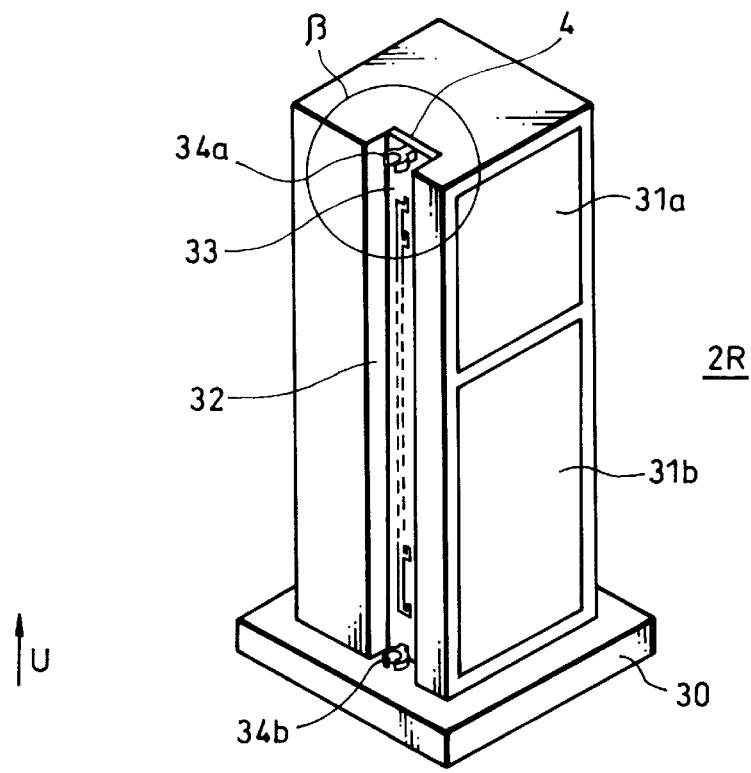
FIG. 11A is a perspective view of a right speaker to which a holding portion is attached.
Figure 11B:
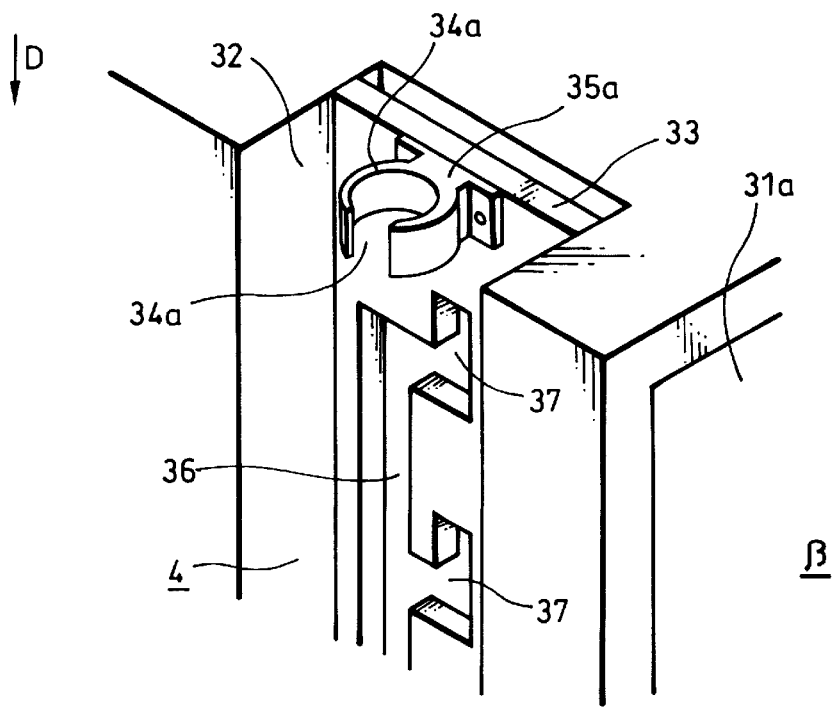
FIG. 11B is a perspective view showing a neighborhood of a part enclosed by a circle β of FIG. 11A, in an enlarged state.
Figure 12C:
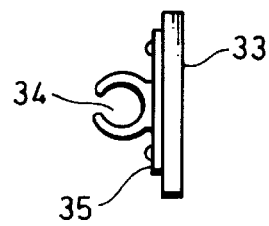
FIG. 12C is a top view thereof.
Figure 12E:
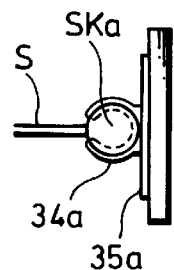
FIG. 12E is a top view of the case where the end portion of a screen S is held.
Figure 12A:
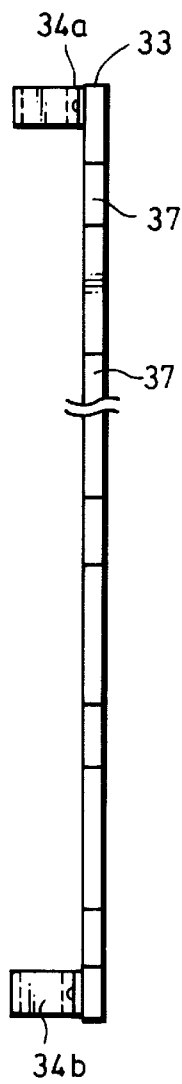
FIG. 12A is a side view showing a holding portion.
Figure 12B:
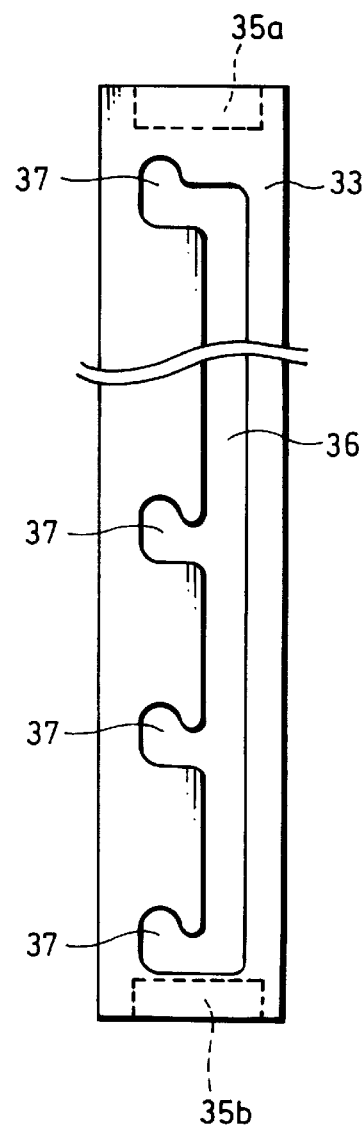
FIG. 12B is a back view thereof.
Figure 12D:
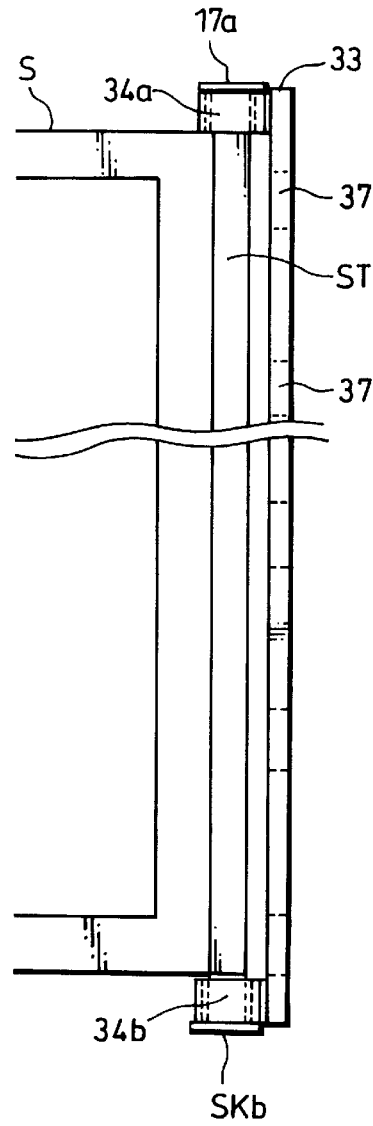
FIG. 12D is a side view of a case where an end portion of a screen is held.

11A is a perspective view of the right speaker 2R to which the holding 4 is attached, and FIG. 11B is a perspective view showing, in an enlarged scale, a neighborhood of a part enclosed by the circle β of FIG. 11A. FIGS. 12A to 12E are diagrams showing the holding portion 4, in which FIG. 12A is a side view thereof, FIG. 12B is a back view thereof, FIG. 12C is a top view thereof, FIG. 12D is a side view in a case where the end portion of the screen S is held, and FIG. 12E is a top view in a case where the end portion of the screen S is held.

As shown in FIGS. 11A, 11B, the holding portion 4 is formed of a back board 33 supporting the whole holding portion 4 and fitted portions 34a, 34b located at the upper and lower ends of the back board 33. By pulling the screen S out of the winding portion 3 and fitting the fitting portions SKa, SKb of the holding bar ST thereof into the fitted portions 34a, 34b, the screen S can be spread between the left and right speakers 2L, 2R.

The fitted portions 34a, 34b are each made of, for example, elastic materials such as plastics, rubber or the like, and each are formed like a channel with a cross section of a partial circle (having an inner diameter a little larger than the diameters of the fitting portions SKa, SKb) of approximately 270°. They are formed integrally with seating portions 35a (35b) securing the fitting portions 34a, 34b themselves to the upper and lower end portions of the back board 33, and are secured, for example, with a screw.

Next, according to FIGS. 12A to 12E, the holding portion 4 will be described in detail. A guide groove 36 and attaching grooves 37, 37, 37, . . . corresponding to the guide groove 16 and the attaching grooves 17 of the winding portion 3 previously shown in FIG. 9B, are formed in the back board 33 of the holding portion 4, too. By engaging the attaching screws 22 of the attaching member 21R attached in a groove 32 of the speaker box 2RX of the right speaker 2R, with the tip ends of the attaching grooves 37, the holding portion 4 can be secured to the right speaker 2R.

Moreover, when releasing the engaging state, the attaching screws 22 should be removed from the tip ends of the attaching grooves 37 by lifting the back board 33 a little upward. Furthermore, by releasing the engaging state and fitting the attaching screws 22 in the guide groove 36, the holding portion 4 can be moved along the guide groove 36 in the vertical direction.

Furthermore, two or more fitted portions 34a, 34b may be formed according to the size of the screen S, and the shape thereof is also not limited to a channel-like shape. For example, it is also possible that the fitting portion SK is shaped like a ball and is inserted into a hole pierced in the back board 33.

(5) Secured State of a Screen

Figures 13A, 13B:
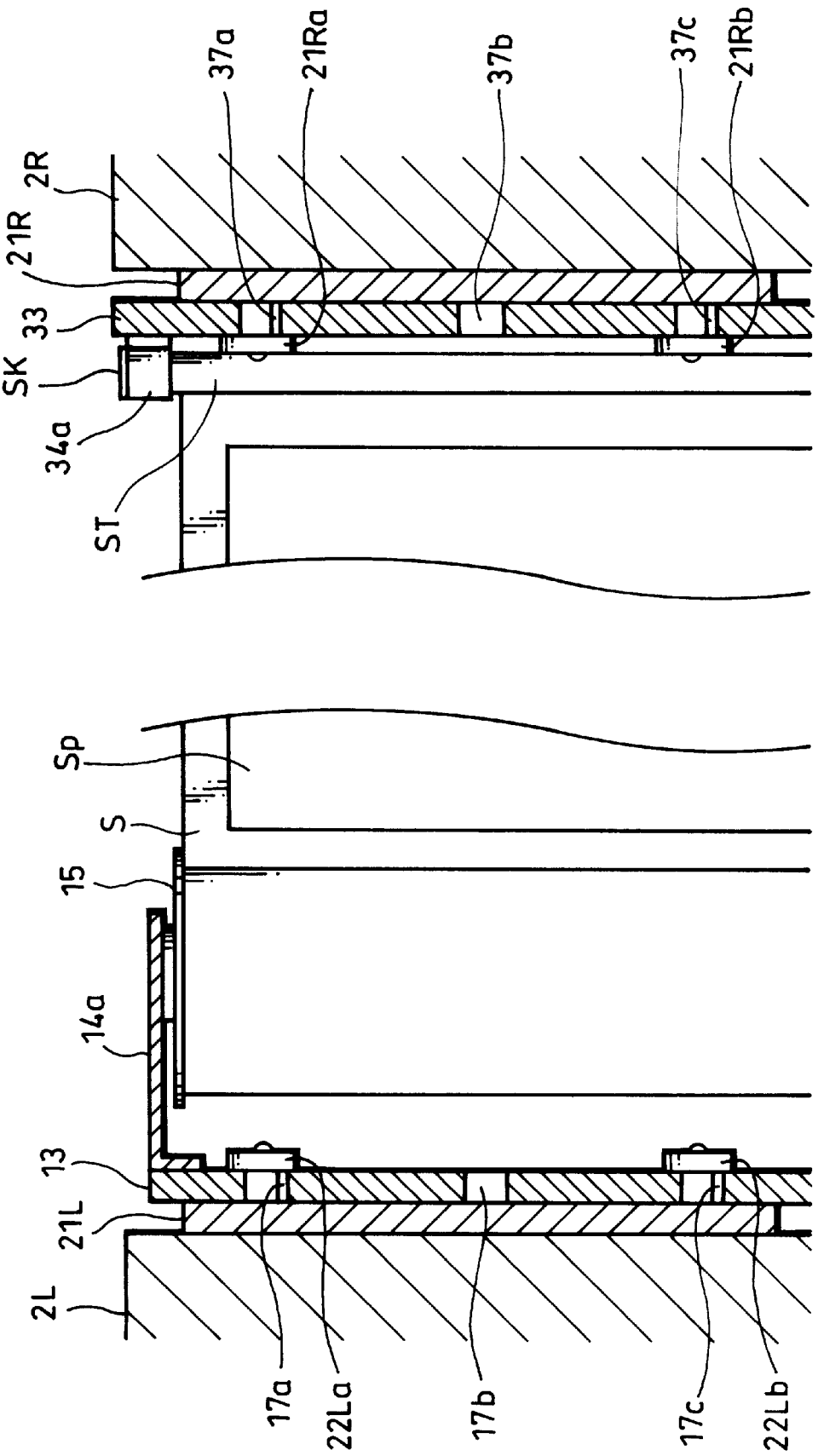
FIG. 13A is a cross sectional view showing a neighborhood of a winding portion in a state where the upper sides of a winding portion and a holding portion are positioned at the same height as left and right speakers 2L, 2R.
FIG. 13B is a cross sectional view showing a neighborhood of the holding portion in that state.

Next, with reference to FIGS. 13A, 13B and FIGS. 14A, 14B, a secured state of the screen S, that is, a secured state of the winding portion 3 and that of the holding portion 4 will be described. FIGS. 13A, 13B show a state where the upper sides of the winding portion 3 and the holding portion 4 are, for example, positioned at the same height as the left and right speakers 2L, 2R, in such a way that a part (upper portion) is shown by a cross section, and the state is corresponding to the state of above mentioned FIG. 6A. Furthermore, FIGS. 14A, 14B show a part of a state where the winding portion 3 and the holding portion 4 are secured at a position higher than the speakers 2L, 2R, by using a cross section, and are corresponding to the above mentioned FIG. 6B.

To the attaching grooves 17, 37 and the screw members 22 of the attaching member 21 shown in FIGS. 13A, 13B and FIGS. 14A, 14B, subscripts of lower cases of the alphabet are given, for convenience, and then, they will be described.

As shown in FIG. 13A, when the screen S is spread at the same height as the left and right speakers 2L, 2R, an attaching screw 22La is engaged with in an attaching groove 17a of the winding portion 3, and similarly, an attaching screw 22Lb is engaged with an attaching groove 17c. Furthermore, an attaching screw 22Ra is engaged with an attaching groove 37a of the holding portion 4, and similarly, an attaching screw 22Rb is engaged with an attaching groove 37c.

When the screen S is spread at a position higher than the position in the state shown in FIGS. 13A, 13B, as mentioned above, the winding portion 3 and the holding portion 4 are moved upward along the guide groove 16 and the guide groove 36, after once releasing engagements the attaching grooves 17a, 17b, 17c, . . . , the attaching grooves 37a, 37b, 37c, . . . , with the attaching screws 22La, 22Lb, and the attaching screws 22Ra, 22Rb.

Then, as shown in FIGS. 14A, 14B, the attaching screw 22La is engaged with the attaching groove 17b and the attaching screw 22Lb is engaged with the attaching groove 17d, and further the attaching screw 22Ra is engaged with the attaching groove 37b and the attaching screw 22Rb is engaged with the attaching groove 37d, so that the winding portion 3 and the holding portion 4 can be secured at a position higher than the position in the state shown in FIGS. 13A, 13B. In that state, as shown in FIG. 6B, the screen S can be spread at a position higher than the left and right speakers 2L, 2R.

In FIGS. 13A, 13D and FIGS. 14A, 14B, a state where the screen S is spread, is shown. However, actually, it is possible that the winding portion 3 and the holding portion 4 are moved in the vertical direction without spreading the screen S, and after determining the securing position, the screen S is pulled out of the winding portion 3 and is spread.

Thus, in the second embodiment, the height where the screen S is spread can easily be changed, so that the height where the screen S is positioned can easily be changed according to the position where users are enjoying a picture on the screen S, or the like.

(6) Modifications of the Winding Portion and the Holding Portion

Figure 15A:
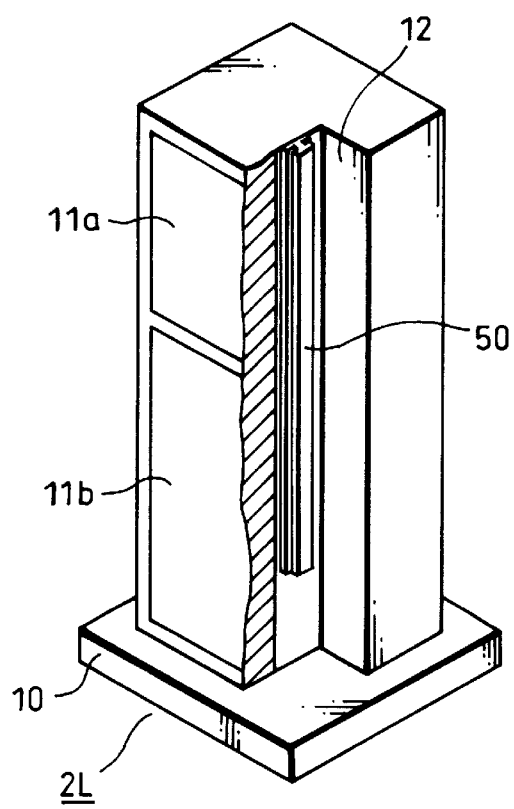
FIG. 15A is a perspective view showing a securing means of a modification of the winding portion.
Figure 15B:
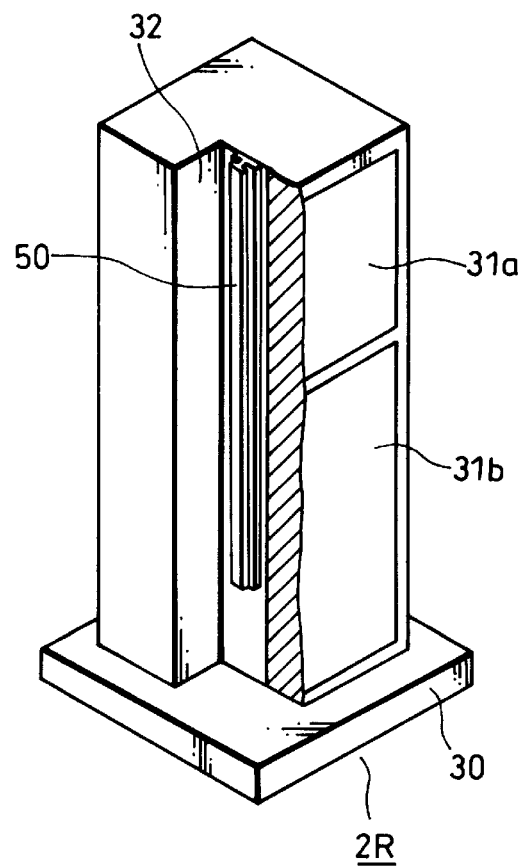
FIG. 15B is a perspective view showing a securing means of a modification of the holding portion.
Figure 15C:
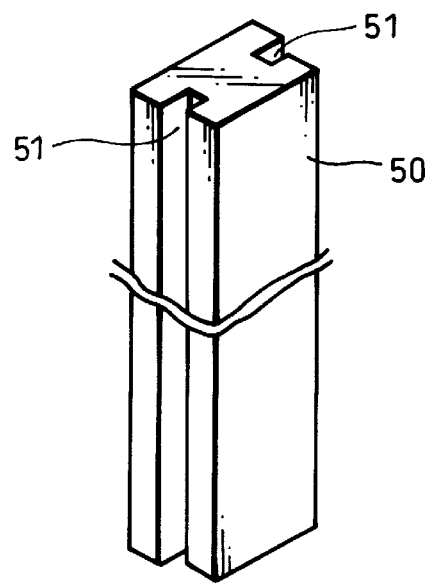
FIG. 15C is an enlarged perspective view showing the securing means.

Next, with reference to FIGS. 15A to 15C, modifications of the winding portion and the holding portion will be described. FIGS. 15A to 15C are diagrams used for explaining a securing member for securing the winding portion 3 to the left speaker 2L, in which FIG. 15A is a perspective view showing a securing member attached in a groove of the left speaker 2L, FIG. 15B is a perspective view showing a securing member attached in a groove of the right speaker 2R, and FIG. 15C is a perspective view showing, in an enlarged scale, a securing member to be attached in each of the grooves of the speakers 2L, 2R.

Figure 16A:
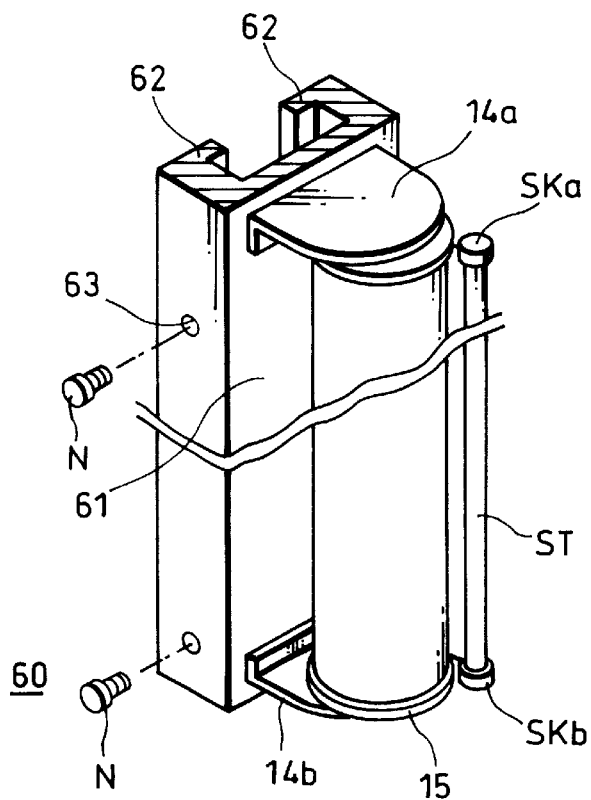
FIG. 16A is a perspective view showing a modification of the winding portion.
Figure 16B:
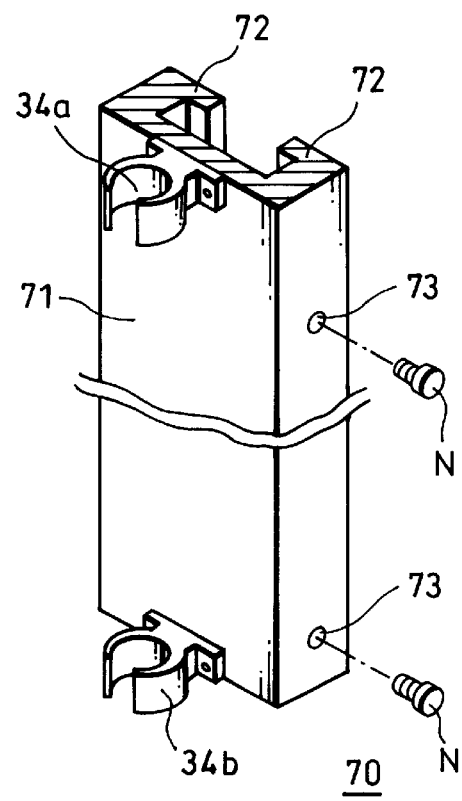
FIG. 16B is a perspective view showing a modification of the holding portion.

In the above modification, as shown in FIGS. 15A, 15B, a securing member (fitting members on one side) 50 is attached in the grooves 12, 32 respectively formed in the left and right speakers 2L, 2R. To the securing members 50, a winding portion 60 and a holding portion 70 later described according to FIGS. 16A, 16B are secured in a way different from the way of the above mentioned example. Here, the securing member 50 is attached to the groove in such a way that the top of the securing member 50 and the upper end board of the speaker box form the same surface.

In the securing member 50 of the modification, as shown in FIG. 15C in an enlarged scale, fitting grooves 51, 51 are formed on the both sides of the securing member 50 in the vertical directions of the speakers 2L, 2R. By fitting the sliding portions formed on back boards of the winding portion 60 and the holding portion 70 into the fitting grooves 51, 51 and fastening them with screws N, the winding portion 60 and the holding portion 70 can be secured at any height relative to the speakers 2L, 2R.

Next, with reference to FIGS. 16A, 16B and FIG. 17, another modification of the winding portion and the holding portion will be described. FIG. 16A is a perspective view showing a winding portion of the modification, FIG. 16B is a perspective view showing a holding portion of the modification, and FIG. 17 is a cross sectional view showing a part of the winding portion of FIG. 16A in an enlarged scale.

The winding portion 60 of the modification in FIG. 16A and the holding portion 70 of the modification in FIG. 16B have the same structures as the winding portion 3 and the holding portion 4 of the above mentioned embodiment except for the back boards. To the back boards (fitting portions on the other side) 61, 71 constituting the winding portion 60 and the holding portion 70 of the modification, sliding portions 62, 62 and sliding portions 72, 72 are formed respectively. Furthermore, in the side surfaces of the back boards 61, 71, screw holes 63, 73 are formed.

Figure 17:
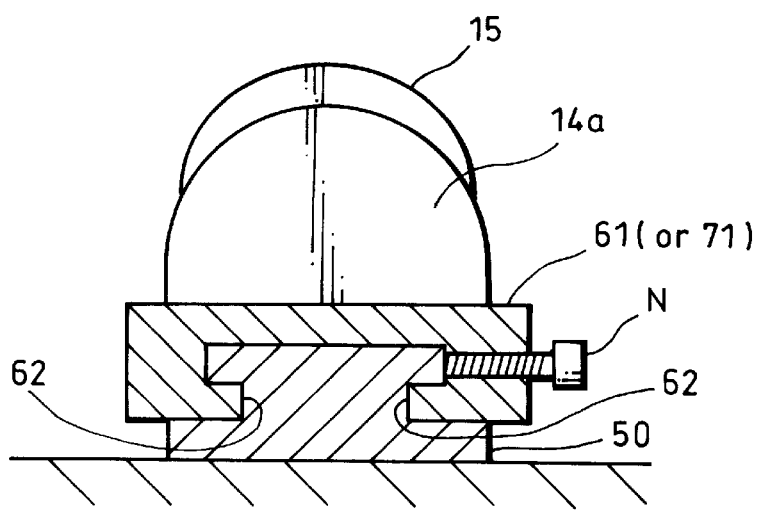
FIG. 17 is a cross sectional view showing a part of the winding portion of FIG. 16A in an enlarged state.

By fitting the sliding portions 62, 62 and the sliding portions 72, 72 into the fitting ditches 51, 51 of the securing members 50, for example, from above, they are combined, for example, as shown in FIG. 17 by a cross section, and in that state, by threading the screws N into the screw holes 63, 73 from the side and fastening them, the tip ends of the screws N press the side of the securing member 50, so that the winding J portion 60 and the holding portion 70 can be secured to the left and right speakers 2L, 2R respectively.

The attaching means for respectively attaching the screen winding means 3 and the screen holding means 4 to the left and right speakers (first and second speakers) 2L, 2R to be movable in the vertical direction are formed of the securing members (fitting members on one side) 50 and the back boards (fitting members on the other side) 61, 71.

Moreover, the fitting groove 51 of the securing member 50 and the sliding portions 62, 72 of the back boards 61, 71 are formed in such a size as to be fitted with a certain pressure by friction, and are arranged to be held in the position even when the screws N are loosened, so that positioning of the securing height is easy.

Figure 18A:
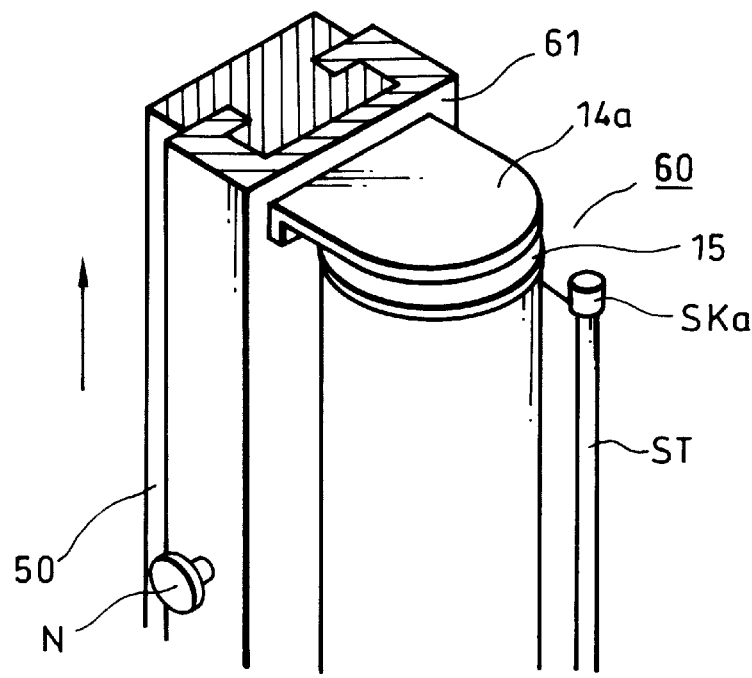
FIG. 18A is a perspective view used for explaining a secured state of a modification of the winding portion.
Figure 18B:
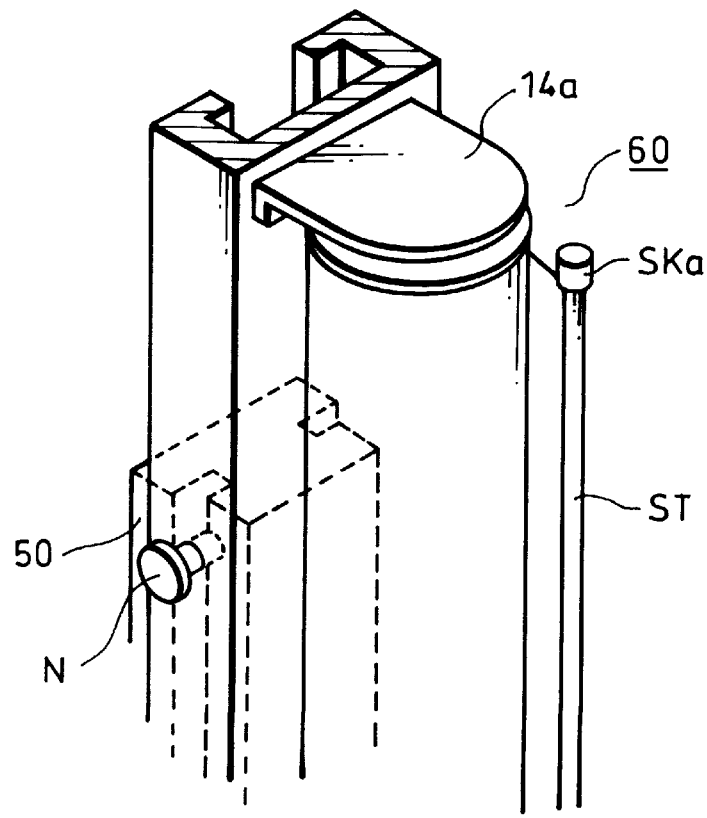
FIG. 18B is a perspective view used for explaining a secured state of a modification of a winding portion, in which a part (upper part) is shown in a cross section, and which corresponds to the state of the above mentioned FIG. 6A.

Next, with reference to FIGS. 18A, 18B, a secured state of the winding portion 60 of the modification will be described. FIGS. 18A, 18B are each a perspective view used for explaining the secured state of the winding portion of the modification. Furthermore, in FIGS. 18A, 18B, hatched portions of the securing member 50 and the winding portion 60 show top surfaces thereof. In FIGS. 18A, 18B, the speaker 2L is omitted.

When the winding portion 60 is fitted in the securing member 50, and the screws N are fastened, for example, in a state shown in FIG. 18A, the winding portion 60 is secured at the same height of the speaker 2L to which the securing member 50 is attached. When the holding portion 70 is secured to the speaker 2R at the same height as the winding portion 60 and the screen S is spread (which is not shown in the figure), the same state as shown in above mentioned FIG. 6A will be created.

When the secured position of the winding portion 60 in the state shown in FIG. 18A is moved, for example, upward, by moving the winding portion 60 upward along the securing member 50 after once loosening the screws N and positioning it at a desired height and fastening the screws N, the winding portion 60 can be secured, for example, as shown in FIG. 18B, at a position higher than the top portion of the securing member 50. Then, by moving and securing the holding portion 70 at the same height as the winding portion 60 in the speaker 2R, the screen S can be spread, for example, similarly to the state shown in the above mentioned FIG. 6B, at a position higher than the left and right speakers 2L, 2R.

Thus, in the modification, by vertically sliding the winding portion 60 and the holding portion 70, adjusting of the height of the screen S can be performed continuously in the range where sliding is possible. Moreover, when securing the winding portion 60 and the holding portion 70, the securing can easily be performed by fastening the screws N.

Furthermore, in the above mentioned embodiments and modification, the groove 12 and the groove 32 are formed in the box-like bodies of the speakers 2L, 2R, and in the insides thereof, the attaching member 21 and the securing member 50 are attached, but they may be, for example, directly attached to the box-like bodies without forming the groove 12 and the groove 32. Furthermore, by forming covers or the like for hiding the groove 12 and the groove 32, the appearance of the left and right speakers 2L, 2R can be kept in a good state even when the screen S is not used.

Furthermore, in the above mentioned embodiment and modification, a case is explained, where the winding portions 3, 60 are located on the speaker 2L, and the holding portions 4, 70 are located on the speaker 2R. However, the winding portions 3, 60 may be located on one of the left and right speakers 2L, 2R and the holding portions 4, 70 may be located on the other of the left and right speakers 2L, 2R.

Moreover, the attaching member 21 and the securing member 50 may be formed integrally with the left and right speakers 2L, 2R.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A speaker apparatus combined with a picture projecting screen, comprising:

a first speaker unit having a first upright floor-standing speaker box with a first housing portion formed therein to extend along a vertical side of the first speaker box;

a second speaker unit having a second upright floor-standing speaker box with a second housing formed therein to extend along a vertical side of the second speaker box and having a holding portion formed in the second housing;

a picture projecting screen formed as a roll for retractably extending between said first speaker unit and said second speaker unit in an unrolled condition;

a screen winding element attached to a first edge of said picture projection screen and including winding means for winding said picture projection screen into said roll, said screen winding element being attached to said first upright floor-standing speaker box and residing in said first housing portion; and a holding bar attached to a second edge of said picture projecting screen opposite said first edge whereat said screen winding element is attached for removably attaching said picture projection screen to said holding portion of said second housing portion, said picture projection screen extending between said first and second speaker units when said holding bar is attached to said holding portion, whereby said screen winding element causes said picture projecting screen to be wound in said roll and arranged within said first housing portion when said holding bar is detached from said holding portion.

2. The speaker apparatus combined with a picture projecting screen according to claim 1, wherein said first housing portion is arranged inside said first upright floor-standing speaker box and includes a longitudinal slot formed therein having a first predetermined width less than a width of said holding bar, whereby said holding bar attached to said second edge of said picture projecting screen resides outside of said slot in said first holding portion when said picture projecting screen is wound in said roll by said screen winding element.

3. The speaker apparatus combined with a picture projecting screen according to claim 2, wherein said second housing portion is arranged inside said second upright floor-standing speaker box and includes a longitudinal slot formed therein having a predetermined width greater than the width of said holding bar, whereby said holding bar resides inside of said second housing portion when said holding bar is attached to said second holding portion.

4. A speaker apparatus combined with a picture projection screen, comprising:

a first speaker unit having a first upright floor-standing speaker box with a first housing portion formed therein to extend along a vertical side of the first speaker box and having a first holding portion formed therein;

a second speaker unit having a second upright floor-standing speaker box with a second housing portion formed therein to extend along a vertical side of the second speaker box and having a second holding portion formed therein;

a picture projecting screen formed as a roll for retractably extending in an unrolled condition between said first speaker unit and said second speaker unit;

a screen winding element attached to a first edge of said picture projecting screen and including winding means for winding said picture projecting screen into said roll and attachment means for attaching said winding means to said first holding portion arranged in said first housing portion; and a holding bar attached to a second edge of said picture projecting screen opposite said first edge for removably attaching said picture projection screen to said second holding portion arranged in said second housing portion, said picture projection screen extending between said first and second speaker units when said holding bar is attached to said second holding portion, whereby said screen winding element causes said picture projecting screen to be wound in the roll and arranged in said first housing portion when said holding bar is detached from said second holding portion.

5. The speaker apparatus combined with a picture projection screen according to claim 4, wherein said first and second housing portions are formed as grooves having open upper ends in said vertical sides of said first and second upright floor-standing speaker boxes, respectively, and said first holding portion includes an attaching member having attaching projections formed thereon and said attaching means of said screen winding element includes a back board having a guide groove and attaching grooves formed therein for cooperating with said attaching projections, said second holding portion includes attaching screws formed in a wall of said housing portion, a back board having a guide groove and attaching grooves for cooperating with said attaching screws, and a fitted portion for receiving said holding bar, whereby upon positioning said attaching projections in selected ones of said attaching grooves of said back board of said first holding portion and upon positioning said attaching screws in selected ones of said attaching grooves of said back board of said second holding portion an upper edge of said picture projection screen in an extended position between said first and second speaker units is above top surfaces of said first and second speaker units.

6. The speaker apparatus combined with a picture projection screen according to claim 5, wherein said holding bar is formed as a round rod and said fitted portion of said second holding portion includes a fitted portion for receiving said holding bar and said fitted portion is formed of elastic material in a channel shape with a partial-circle cross-section of substantially 270°.

7. The speaker apparatus combined with a picture projection screen according to claim 4, wherein said first and second housing portions are formed as grooves having open upper ends in said vertical sides of said first and second upright floor-standing speaker boxes, respectively, and wherein said first holding portion includes a first elongate securing member having a pair of fitting grooves formed in opposite longitudinal side surfaces thereof and being attached to a side of the groove forming said first housing portion and said attachment means of said screen winding element includes a first back board having a pair of sliding portions slidably engaged with said pair of fitting grooves in said elongate securing member, and said second holding portion includes a second elongate securing member having a pair of fitting grooves formed in opposite elongate side surfaces thereof and being attached to a side of the groove forming said second housing portion and includes a second back board having fitting portions attached thereto for receiving said holding bar and being formed with a pair of sliding portions slidably engaged with said pair of fitting grooves in said elongate securing member.

8. The speaker apparatus combined with a picture projection screen according to claim 7, further comprising:

a first securing screw threaded into said first back board for arresting sliding movement between said first back board and said first elongate securing member; and a second securing screw threaded into said second back board for arresting sliding movement between said second back board and said second elongate securing member.

* * * * *